(12) United States Patent
Madsen

(10) Patent No.: US 7,308,259 B2
(45) Date of Patent: Dec. 11, 2007

(54) DEVICE AND METHOD FOR FORMING A SET OF CELLS FOR TIME DIFFERENCE MEASUREMENTS, AND FOR MEASURING TIME DIFFERENCES FOR LOCATING A USER OF A MOBILE TERMINAL

(75) Inventor: Allan Madsen, Aalborg (DK)

(73) Assignee: Siemens Aktiengesellschaft, Munich (DE)

( * ) Notice: Subject to any disclaimer, the term of this patent is extended or adjusted under 35 U.S.C. 154(b) by 229 days.

(21) Appl. No.: 10/777,880

(22) Filed: Feb. 11, 2004

(65) Prior Publication Data

US 2004/0235471 A1    Nov. 25, 2004

(30) Foreign Application Priority Data

Feb. 11, 2003    (EP) ................... 03002992

(51) Int. Cl.
*H04Q 7/20* (2006.01)
(52) U.S. Cl. ............... 455/434; 455/67.13; 455/456.1; 370/350; 370/328
(58) Field of Classification Search ............... 455/434, 455/432.1, 456.1, 515, 525, 67.11, 67.13, 455/436–444; 370/350, 328, 329, 330, 331–333
See application file for complete search history.

(56) References Cited

U.S. PATENT DOCUMENTS

| | | | | |
|---|---|---|---|---|
| 5,577,022 A | * | 11/1996 | Padovani et al. | ............ 370/332 |
| 5,960,341 A | * | 9/1999 | LeBlanc et al. | ......... 455/426.1 |
| 5,966,670 A | * | 10/1999 | Keskitalo et al. | ......... 455/562.1 |
| 6,049,715 A | * | 4/2000 | Willhoff et al. | .............. 455/436 |
| 6,104,936 A | * | 8/2000 | Kronestedt | ............... 455/562.1 |
| 6,192,244 B1 | * | 2/2001 | Abbadessa | .................. 455/436 |
| 6,201,803 B1 | | 3/2001 | Goetz et al. | |
| 6,408,246 B1 | | 6/2002 | Fox | |
| 6,445,924 B1 | * | 9/2002 | Rasanen | ..................... 455/437 |
| 6,484,034 B1 | | 11/2002 | Tsunehara et al. | |
| 2004/0176090 A1 | * | 9/2004 | Mudigonda et al. | ........ 455/434 |

FOREIGN PATENT DOCUMENTS

| | | |
|---|---|---|
| EP | 0 930 513 A2 | 7/1999 |
| WO | WO 01/58201 | 8/2001 |

* cited by examiner

*Primary Examiner*—Lester G. Kincaid
*Assistant Examiner*—Diego Herrera
(74) *Attorney, Agent, or Firm*—Bell, Boyd & Lloyd LLP

(57) ABSTRACT

A method and device are provided, for locating a user of a mobile terminal, for forming a set of cells for time difference measurements for a mobile terminal camped on a first cell of a cellular network and being in idle mode, the method including the steps of: receiving a first set of cell identifiers of neighboring cells for the first cell, with each of the neighboring cells sending a radio signal on synchronization channels; and measuring the received signal strength for cells having identifiers which are included in the first set, with a number N of cells having a signal strength exceeding a predefined threshold constituting a set of available cells; wherein the improvement includes the steps of: reading the synchronization channels for the set of available cells, thereby measuring time differences for the set of available cells; and selecting a second set from the set of available cells using a predefined selection rule, the second set including M<N cells, thus forming a new set of cells for time difference measurements.

6 Claims, 4 Drawing Sheets

| BSIC | BCCH | TOA | OTD |
|------|------|-----|-----|
| A | a | $T_a$ | --- |
| B | b | $T_b$ | $T_b - T_a$ |
| C | $c_1$ | $T_{c_1}$ | $T_{c_1} - T_a$ |
| C | $c_2$ | $T_{c_2}$ | $T_{c_2} - T_a$ |
| D | d | $T_d$ | $T_d - T_a$ |

FIG 5

COMPUTE

| i | $BSIC_i$ | $BCCH_i$ | $TOA_i$ | $OTD_i$ | $\Delta jk$ | $\Delta jk$ |
|---|---|---|---|---|---|---|
| 1 | A | a | $T_a$ | — | | |
| 2 | B | b | $T_b$ | $T_b - T_a$ | NO | |
| 3 | C | $c_1$ | $T_{c_1}$ | $T_{c_1} - T_a$ | YES | $\|T_{c_1} - T_{c_2}\|$ |
| 4 | C | $c_2$ | $T_{c_2}$ | $T_{c_2} - T_a$ | YES | $\|T_{c_1} - T_{c_2}\|$ |
| 5 | D | d | $T_d$ | $T_d - T_a$ | NO | |
| ⋮ | | | | | | |
| n | | | | | | |

$$OTD_i \equiv TOA_i - TOA_1 \; ; \; i = 2 \ldots n$$

Note: $\Delta jk \equiv \| OTD_j - OTD_k \| \quad j \neq k$
$$2 \leq j, i \leq n$$
$$= \| TOA_j - TOA_k \|$$

DEVICE AND METHOD FOR FORMING A SET OF CELLS FOR TIME DIFFERENCE MEASUREMENTS, AND FOR MEASURING TIME DIFFERENCES FOR LOCATING A USER OF A MOBILE TERMINAL

BACKGROUND OF THE INVENTION

The present invention relates to forming a set of cells for time difference measurements and, more specifically, to measuring such time differences for locating a user of a mobile terminal.

If someone is in trouble or notices something alarming happening and dials an emergency number, such as 112 in Europe or 911 in the U.S., the emergency services (police, ambulance, fire department) need to know where the help is needed. A caller may, especially under difficult circumstances, such as at night or in a location not known to the caller, find it extremely difficult to give route guidance for the emergency services.

Mobile terminals are widely used. Their penetration has in many countries reached and exceeded 900 of the total population. As a consequence, most people are carrying a mobile terminal with themselves while being away from home.

Cellular networks can be arranged to measure the coordinates of a mobile terminal of a subscriber under network coverage. One of the straightforward solutions then is to use this location information of the mobile terminal for locationing the subscriber who is calling an emergency number.

In the U.S., each cellular carrier is required to implement the E911 service as required by the Federal Communications Commission (FCC) in its order FCC 02-283 which, at the time of writing (Feb. 3, 2003), can be found on the Internet at the address:

http://hraunfoss.fcc.gov/edocs public/attachmatchlFCC-02-283A1.pd. Originally, the locationing accuracy in the so-called Phase II was first specified to 100 meters for 670 of calls and 300 meters for 95% of calls. From early October 2003, however, the locationing accuracy will be enhanced to 50 meters for 67% of calls and 150 meters for 95% of calls, which can be found at: http://www.fcc.gov/Bureaus/wireless/News Releases/2001/nw 1012 7a.pdf.

For the Global System for Mobile communications (GSM), the locationing is usually performed by using the so-called Enhanced Observed Time Difference E-OTD method.

It is possible to make the locationing measurements in idle mode, this kind of approach being used by some manufacturers. Typically, the locationing interval is approximately 10 seconds. Then, the locationing history is already known by the mobile terminal MS when it enters dedicated mode. Not only the location but also speed and direction, if any, can be determined.

Other manufacturers do not use idle mode measurements. Rather, the location of the mobile terminal is found out only at the beginning of each 911 or 112 call. Presently, such manufacturers have at least some problems in obtaining the desired accuracy. According to some opinions, in order to achieve the accuracy requirements it is necessary to execute idle mode measurements for neighboring cells.

The problem with the state-of-the-art solutions is that the continuously performed measurement of time differences consumes a great deal of power, significantly reducing the standby time of the mobile terminal. As such, the battery of the mobile terminals needs to be recharged quite often. This is an undue burden for most mobile subscribers because the mobility of the user is, obviously, substantially limited while the battery of the mobile terminal is being recharged.

One solution for channel measurements, as disclosed in international patent application WO 2001/58201, is for the mobile terminal to receive a neighbor cell list from a base station. Channel quality measurements are performed for the cells on the list based on the location of the mobile device. This is performed in order to reduce the power consumption in the terminal.

The solution proposed in WO 2001/582-1 is, however, far from optimal for locationing measurements. It cannot be used if the location of the mobile station is not known. Further, it has turned out to be extremely difficult to construct neighbor cell lists in such a manner that they would not only provide enough cell reselection possibilities but also enable good enough quality for time difference measurements still saving power in the mobile terminal.

EP 0 930 513 A2 presents a cellular radio network based positioning system for determining the position of a mobile station. For each base transceiver station or cell of the network, a fixed list of base transceiver stations is stored by a mobile positioning center. Each list identifies those base transceiver stations which enable the position of a mobile station served by the corresponding base transceiver station to be optimally determined. The list is transmitted to the mobile station via the serving base transceiver station and the mobile station determines an observed time difference for each of the listed base transceiver stations, relative to the serving base transceiver station, from signals broadcast by the listed base transceiver stations. The observed time differences are transmitted from the mobile station to the serving base transceiver station and are used by the network to compute the position of the mobile station.

SUMMARY OF THE INVENTION

Accordingly, the present invention proposes a method and a device with which it is possible to form a set of cells for time difference measurements and to perform the measuring of time differences and the locationing of a user of a mobile terminal more economically; thus, using less power in the mobile terminal.

A prior art method for forming a set of cells for time difference measurements for a mobile terminal camped on a first cell of a cellular network and being in idle mode includes the steps of: 1) receiving a first set of cell identifiers of neighboring cells for the first cell, with each of the cells sending a radio signal; and 2) measuring received signal strength for cells, the identifiers of which are included in the first set, with a number N of cells having a signal strength exceeding a predefined threshold constituting a set of available cells.

This prior art method can be improved upon by further performing the steps of: 3) reading a synchronization channel for the set of available cells, thereby measuring time differences for available cells; and then 4) selecting a second set from the set of available cells using a predefined selection rule, the second set including M<N cells and thus forming a new set of cells for time difference measurements. The advantage obtained by the improvement is that the resulting second set is more compact than the set of available cells.

The enhanced method for forming a second set of cells for time difference measurements for a mobile terminal camped on a cell of a cellular network and being in idle mode can be used for enhancing the efficiency of measuring of time differences for the mobile terminal camped on the cell measuring time differences for cells in the second set only. In this manner, the mobile terminal saves energy and the standby time is prolonged.

In particular, a cell from the set of available cells is selected to the second set whenever: 1) a base station identity code of the cell is not equal to a base station identity code of any other cell available; or 2) a base station identity code of the cell is equal to a base station identity code of any other cell available, and 2a) its measured time difference deviates from measured time differences for other cells sharing the same base station identity code more than a predefined threshold, or 2b) it has the largest signal strength among all cells sharing the same base station identity code and has a measured time difference deviating less than or equal to the predefined threshold. The advantage of such a mapping rule is that, in particular, cells having same base station identity code need not be measured if it is very probable that the cells belong to one sectorized base station. Using all such cells for obtaining more time differences, especially for locationing purposes, would only consume more energy without bringing much detailed positioning information.

According to one embodiment of the present invention, the location of a user can be obtained using time differences obtained in accordance with other aspects of the present invention. One advantage from this is that the positioning system may be compatible with the mobile terminal, and can handle a smaller number of time differences than expected, for example.

Additional features and advantages of the present invention are described in, and will be apparent from, the following Detailed Description of the Invention and the Figures.

BRIEF DESCRIPTION OF THE FIGURES

FIG. 5 is an example showing some aspects of cell selection performed according to an embodiment of the present invention.

DETAILED DESCRIPTION OF THE INVENTION

Figure 1:
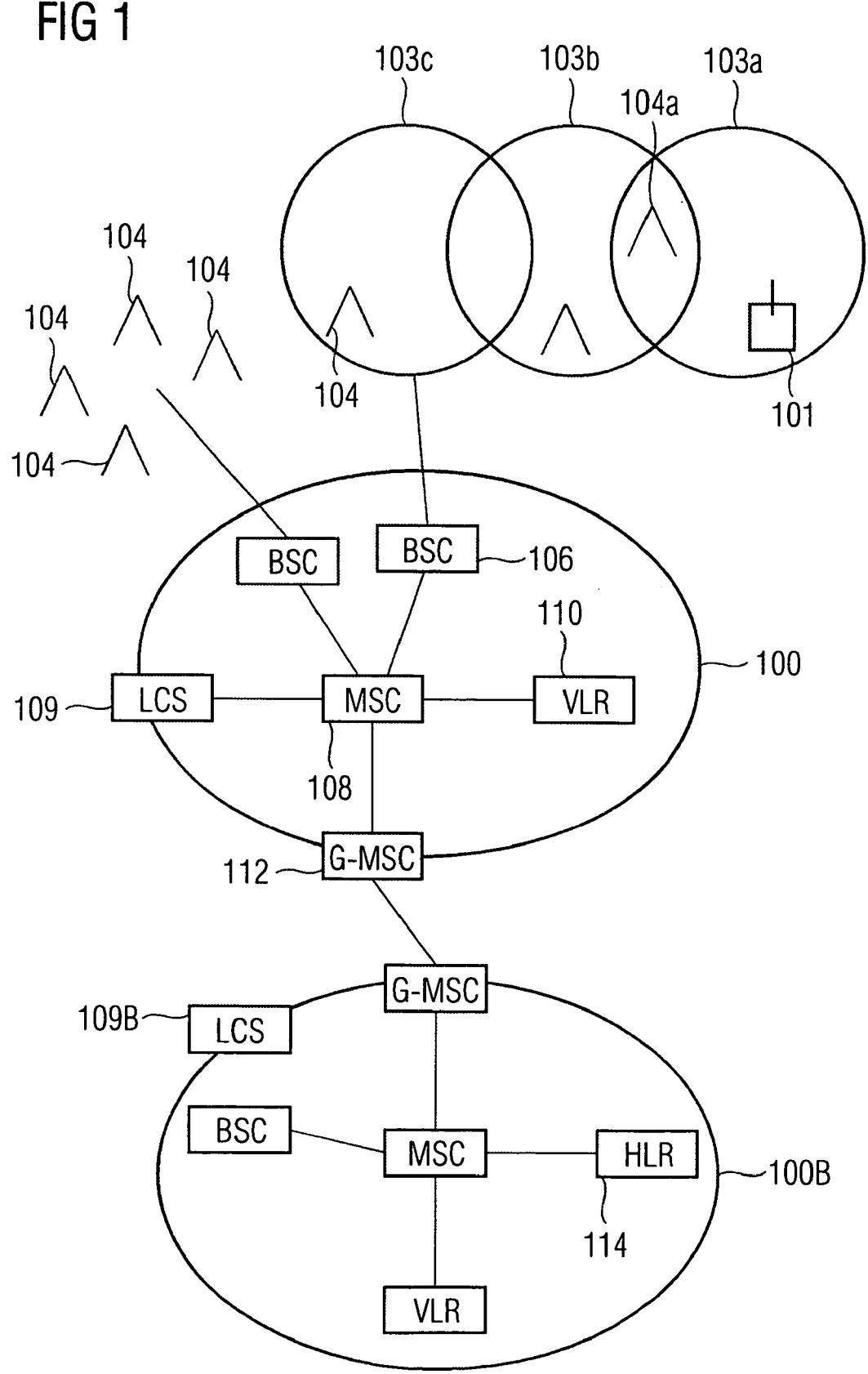
FIG. 1 shows a typical cellular network, such as a GSM network.

FIG. 1 shows a typical cellular network 100, such as a GSM network. Characteristic for the cellular network 100 is that it includes a number of base stations 104. Each of these base stations 104 forms a cell 103a, 103b, 103c. FIG. 1 shows only a small proportion of cells 103 for the sake of clarity. A mobile station 101 camps on one of the cells 103a, 103b, 103c. In other words, when the mobile station 101 is camping on cell 103a, it is under radio coverage of base station 104a.

Typically, base stations 104 are adapted to form cells in such a manner that some cells 103 overlap with each other. Such a construction enables a flexible changing from one cell 104 to another. When the mobile station 101 is in a dedicated mode, such as when there is an ongoing phone call, the changing from one cell 104 to another is called handover. When the mobile station 101 is in idle mode, the changing from one cell 104 to another is called cell reselection. Typically, cell reselection or handovers are performed when the mobile terminal 101 has moved so that the quality of the radio connection between the base station 104 and the mobile station 101 starts to degrade. When the cell reselection includes changing a location area, this is reported to the BSC.

In order to decide whether a handover or cell reselection is necessary, and to which cell the handover or cell reselection should be made, the mobile station 101 continuously measures received signal strength of its S neighboring cells.

Usually, in order to avoid interference, each cell has a frequency different than its neighboring cell. There are also more than one cellular network 100 overlapping, such that a subscriber roaming under network 100 may not be able to use a different network geographically covering the same area. This is one of the reasons why each cell 103 has a so-called neighbor list, sometimes referred to as the BA list. The neighbor list is a cell-based list which includes identifiers of such closest neighbors for the cell 103 which belong to the same cellular network 100. The mobile terminal 101 therefore measures the signal strengths of only the cells 103 having identifiers which were included in the neighbor list.

The cellular network 100 knows the location of mobile terminal 101 in accuracy of a location area LA. Typically, an LA includes several cells 103a, 103b, 103c. Visitor Location Register 110 knows which LA the mobile terminal 101 is under and when a call is terminating to the mobile terminal 101. It is paged via a Base Station Controller BSC 106. BSC is the element which controls a number of the base stations 104. Usually, a cellular network 100 also includes a number of BSCs. The Mobile Switching Center MSC 108 coordinates the different BSCs 106 and then takes care of switching of the traffic to and from different mobile terminals 101. The MSC 108 is usually connected via a Gateway MSC 112 to other cellular networks 100B having a similar structure.

This kind of hierarchy and operational model enables the roaming of mobile station 101, originally coming from another cellular network 100B, under cellular network 100. The cellular network 100B has its own subscribers, the data about whom is stored in Home Location Register HLR 114. The HLR 114 includes all services, etc., which are provided for a given subscriber of the cellular network 100B. In general, in order to reach a subscriber, the HLR 114 knows the VLR 110 address which the subscriber is under.

For locationing purposes, there are Location Services Centers LCS 109 connected into cellular network 100. AN LCS 109 is used, for example, when a subscriber is missing. As explained above, the cellular network 100 knows within the accuracy of a location area LA where the user is, whereas the other cellular network 100B knows only in the accuracy of a VLR 110 area where the user is. Basically, the locationing of the user or mobile terminal 101 can be performed from LCS 109B from cellular network 100B as well, if the operators of cellular networks 100 and 100B have agreed as such.

Because of some legislative considerations, there are usually no problems for an authorized user making a query to LCS 109B if the subscriber is roaming under his/her home cellular network 100B. If the authorities are looking for the user in the geographical area of his/her own cellular network 100B but he/she is roaming under cellular network 100, the authorities need to collaborate with authorities authorized in making LCS inquiries for LCS 109.

Figures 2, 3:
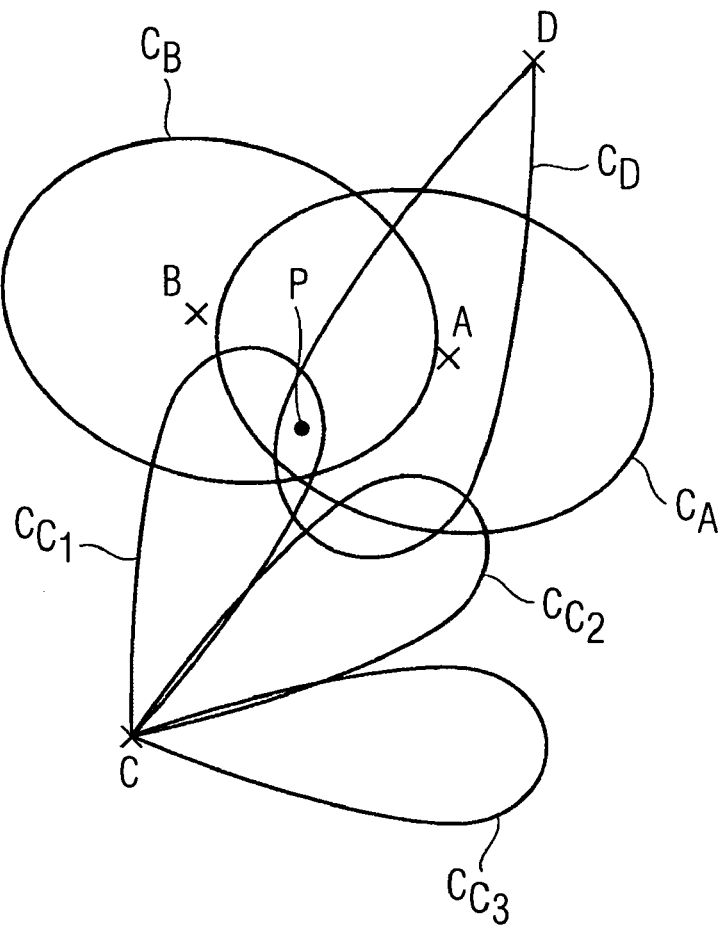
FIG. 2 shows exemplary cells of the cellular network from FIG. 1.
FIG. 3 shows how E-OTD measurements are performed in prior art solutions.

FIG. 2 shows exemplary cells of a cellular network 100. The mobile terminal 101 is camping on cell A having dimensions denoted by curve $C_A$. The cell A has neighboring cells B, C, and D. Cell C is a sectorized cell, so that it includes three sectorized transmitter/receiver units TRX. The sectors C1, C2, and C3 have dimensions denoted by curves $C_{C1}$, $C_{C2}$, $C_{C3}$, respectively. Cells B and D have dimensions denoted by curves CB and CD. The position of the mobile station 101 is denoted by point P.

FIG. 3 shows the principle of how state-of-the-art locationing measurements are performed. Typically, such measurements are used to produce Enhanced Observed Time Difference E-OTD information, which then can be used to interpret the quite accurate location of the user.

When the mobile terminal camps on cell A, it receives the neighbor list from cell A. The neighbor list includes Absolute Radio Frequency Channel Number ARFCN of the Broadcast Control Channel BCCH. The ARFCN is used to select the right frequency from the multitude of different frequencies. The synchronization channel of all the cells in the neighbor list is read before their base station identity codes BSIC can be obtained. BCCH is used to send controlling information to downlink direction, such controlling information including synchronization frames which are sent in the part of the BCCH known as the Synchronization Channel SCH.

The mobile terminal measures received signal strength for the cells included in the neighbor list. It then decides to read the SCH for those cells having a signal strength exceeds a predefined threshold; i.e., which are available. The moment at which the receiving of a data frame in the synchronization table begins is marked as Time of Arrival TOA for the cell.

In this simple example, cell A has a Base Station Identifier Code BSIC "A." BSIC is "B" for cell B, "C" for sectors C1 and C2, and "D" for cell D. Sector C3 is below the predefined threshold; i.e., mobile terminal 101 cannot hear it well enough.

Cell A has BCCH "a." For B, the BCCH is "b," for sector C1 and C2 "c1" and "c2", respectively, and for D the BCCH is "d."

TOA of A is $T_A$, of B $T_B$, of C1 $T_{c1}$, of C2 $T_{c2}$, and of D $T_D$.

As such, the OTD is $T_B$-$T_A$ for cell B, $T_{c1}$-TA for sector C1, and $T_{c2}$-$T_A$ for sector C2. For cell D, the OTD is $T_D$-$T_A$. The principle thus is that the time difference is computed as the difference from the serving cell A.

The mobile station 101 keeps on measuring all the OTDs periodically. The measurement period depends on the particular implementation, but a 10 second interval between measurements is sufficiently satisfactory for locationing purposes.

Figure 4:
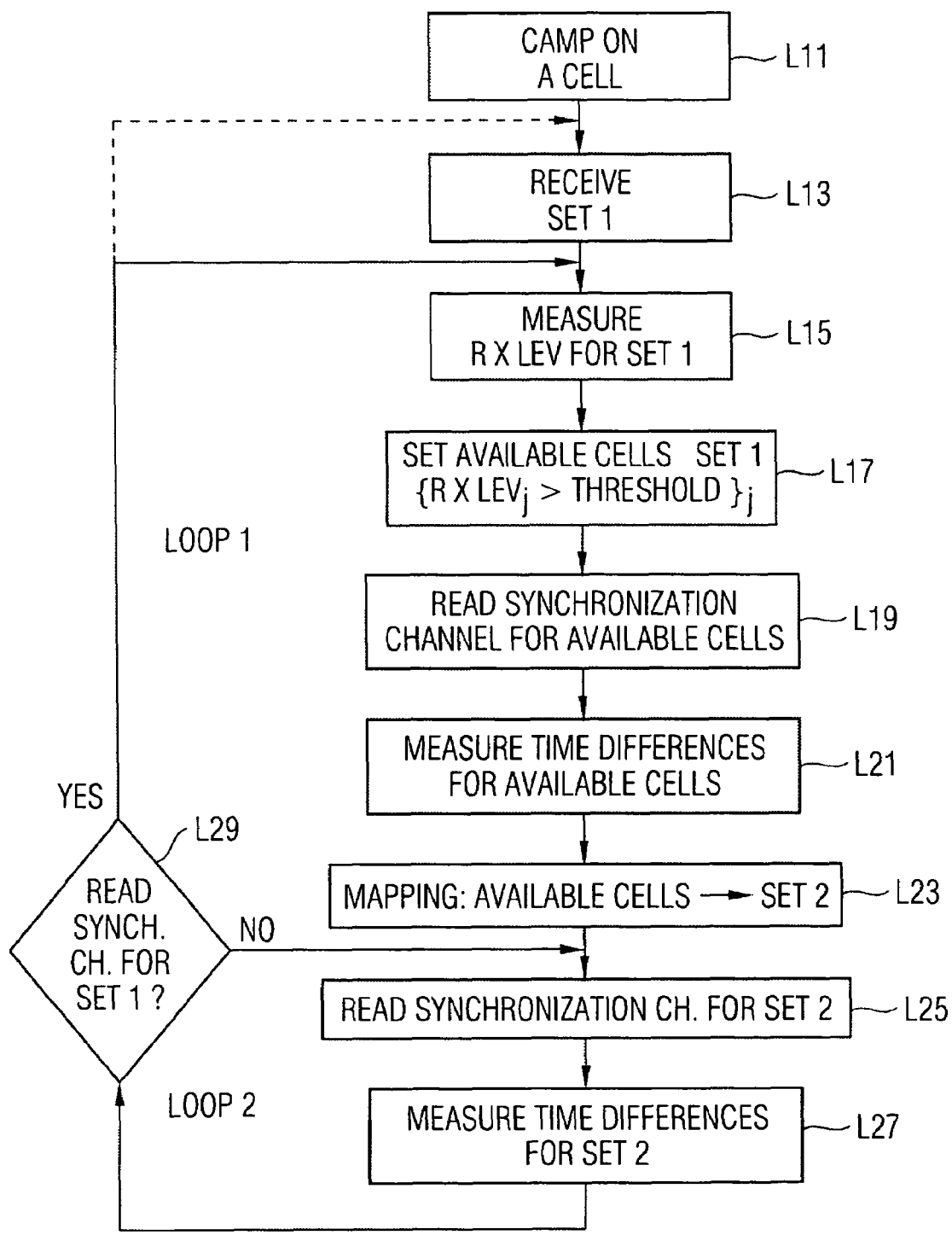
FIG. 4 is a flow chart showing an algorithm using which a set of cells is selected and then further used for measuring time differences.

FIG. 4 shows one particular aspect of the present invention. In step L11, mobile terminal 101 camps on cell A. In step L13 it receives a neighbor list of cell A, the neighbor list being referred to as the first set.

In step L15 the mobile terminal 101 measures the received signal level for each cell having an identifier which was in the neighbor list; i.e., in the first set. In step L17, the mobile station 101 defines the set of available cells. As described above, a cell is determined to be available if the received signal strength is above a predefined threshold value. In some implementations, only a limited number (such as 6) of the strongest neighbor cells are selected, whereas for some other implementations all cells for which the received signal strength exceed some value characteristic for the mobile station are selected.

In step L19, the synchronization channel SCH is read for cells available. In step L21, the mobile station 101 timer value at the beginning of each synchronization frame is stored, this corresponding to measuring time differences for available cells. It is not necessary to read the SCH for measuring the time differences on all occasions. Depending on the cellular network structure, the timing also can be measured in some other way.

According to another aspect of the present invention, the second set is, in step L23, selected from the set of available cells using a predefined selection rule. Then in step L25, synchronization channel SCH could be read for the cells which belong to the second set.

In step L27 the time differences are measured for cells having identifiers which are included in the second set only. The timer value at the beginning of each synchronization frame is stored, this corresponding to measuring time differences for the cells in the second set.

According to a further aspect of the present invention, a predefined mapping rule reads, at least partially, that a cell from the set of available cells is selected to the second set whenever:

1) a base station identity code of the cell is not equal to a base station identity code of any other cell available; or 2) a base station identity code of the cell is equal to a base station identity code of any other cell available, and 2a) its measured time difference deviates from measured time differences for other cells sharing the same base station identity code more than a predefined threshold, or 2b) it has the largest signal strength among all cells sharing the same base station identity code and has a measured time difference deviating less than or equal to the predefined threshold.

In step L29, it is checked whether or not the synchronization channel has to be read for all cells in the neighbor cell list; i.e., the cells in the first set. This has to be performed occasionally. Specification 3GPP TS 05.08 V7.7.0 defines (clause 6.6.1) that "The mobile station shall attempt to check the BSIC for each of the 6 strongest non-serving cell BCCH carriers at least every 30 seconds, to confirm that it is monitoring the same cell. If a change of BSIC is detected, then the carrier shall be treated as a new carrier and the BCCH data re-determined."

The exit criteria, for LOOP2 to be tested in step L29 may include any or a number of the following: i) LOOP2 has been executed a predetermined number of times (1, 2, 3, 4, 5, . . . ) after performing step L15 (counter expiry); ii) the mobile terminal 101 is changing from idle mode to dedicated mode; iii) the step L25 (i.e., reading the synchronization channel SCH for cells in the second set) has failed; iv) timer expiry, cell reselection; or v) neighbor list changed.

Option iii) corresponds to the case that the subscriber is moving and the synchronization channel of at least some of the cells in the second set cannot be received without errors.

If none of the exit criteria for LOOP2 is met, the execution of LOOP2 is continued; i.e., steps L25, L27, and L29 are repeated. If any of the exit criteria for LOOP2 is met, the LOOP1 is executed; i.e., the mobile terminal measures received signal level in step L15 and so on. However, if a new neighbor cell list is being received, then the LOOPI extends to step L13.

FIG. 5 shows some further considerations relating to the present invention. The contents of FIG. 5 include substantially everything from FIG. 3. In addition, the column "COMPUTE $\Delta_{jk}$" includes logical values "yes" and "no." The contents of the column are decided based on the base station identifier code BSIC. If BSIC is identical for any two cells, the COMPUTE $\Delta_{jk}$ is set to a true value. In the opposite case, it has a false value.

Observed Time Difference $OTD_i$ for an i:th entry is defined as follows:

$$OTD_i = TOA_1 - TOA_i,$$

for all $1 < i < n+1$; where $TOA_i$ is the measured time of arrival i.e. the beginning of the synchronization frame for the i:th entry, and the serving cell is the first entry.

The contents of one of the preferred mapping rules included the condition "a cell is selected when its measured time difference deviates from measured time differences for other cells sharing the same base station identity code more than a predefined threshold". In FIG. 5 terms this can be put into the following context:

$$\Delta_{jk} = \|OTD_j - OTD_k\| = \|TOA_j - TOA_k\|$$

for all $j \neq k$; and $1 < j, i < n+1$.

So now $\Delta_{23} = \Delta_{32} = \|T_{c1} - T_{c2}\|$. If this is below a predefined threshold, say $\in$, where $\in / T_{c1}$ can be any relatively small value, say 2.5%-25%, it can be deduced with relative certainty that sectors C1 and C2 belong to the same cell with only one of them being selected.

As a consequence, only one of the sectors C1, C2 is selected to the second set in step L23 and the measurement of the sector not selected can be avoided. The selection rule "the cell having the largest signal strength among all cells sharing the same base station identity code and having a measured time difference deviating less than or equal to the predefined threshold" allows the received signal strength RXLEV in the mobile terminal to be used to select the stronger cell or sector.

One of the main reasons behind this solution is that now the consecutive measurements of sectorized Base Stations 104 can be avoided. The comparison of the time differences is included in some embodiments of the present invention, because some operators are using base station identifiers repetitively. It would then endanger the success of the locationing if the observed time difference OTD for such a cell would not be measured.

Using a 10 second measurement interval, the standby time of a test mobile phone was reduced from 270 hours to roughly 90 hours. It is clear that the 180 hour reduction in the standby time is highly significant for the user. If an operator chooses to repeatedly use sectorized cells, the savings obtained by performing step L23 and repeating steps L25 and L27 instead of steps L19 and L21 saved, in our example, 25% of OTD measurements. As such, depending on the cellular network 100 structure, it is possible to obtain significantly better improvement in the standby time because of smaller energy consumption in the mobile terminal 101.

Although the present invention was described above with reference to specific embodiments, it should be clear that the present invention is not limited to these but may be modified by those skilled in the art without departing from the spirit and scope of the present invention as set forth in the hereafter appended claims. For example, any cellular network having similar neighbor list and base station identifier structure as described can be used. Such networks includes, for example, most GSM, GPRS and UMTS/WCDMA networks.

The invention claimed is:

1. A method for forming a set of cells for time difference measurements for a mobile terminal camped on a first cell of a cellular network and being in idle mode, the method comprising the steps of:

receiving, at the mobile terminal, a first set of cell identifiers respectively associated with neighboring cells of the first cell, with each of the neighboring cells sending a radio signal;

measuring, at the mobile terminal, received signal strengths of the neighboring cells having identifiers which are included in the first set of cell identifiers, with a number N of cells having a signal strength exceeding a predefined threshold constituting a set of available cells;

reading, at the mobile terminal, a synchronization channel for the set of available cells, thereby measuring time differences for the set of available cells;

selecting, at the mobile terminal, a second set of cells from the set of available cells using a predefined selection rule, the second set of cells including M<N cells, wherein the predefined selection rule causes a non-selection of a cell having a same cell identity as another cell in the set of available cells if it is probable that the cell which is not selected and the another cell belong to one sectorized base station; and reading, at the mobile terminal, a synchronization channel for the second set of cells, thereby measuring time differences for the second set of cells.

2. A method for forming a set of cells for time difference measurements for a mobile terminal as claimed in claim 1, wherein time differences at the mobile terminal are measured only for cells in the second set of cells while an exit condition is not fulfilled.

3. method for forming a set of cells for time difference measurements for a mobile terminal as claimed in claim 2, wherein the exit condition includes a counter exceeding a predefined limit value.

4. A method for forming a set of cells for time difference measurements for a mobile terminal as claimed in claim 2, wherein the exit condition includes a timer exceeding a predefined time limit.

5. A method for forming a set of cells for time difference measurements for a mobile terminal as claimed in claim 4, wherein the exit condition includes the mobile terminal changing from idle mode to dedicated mode.

6. A method for forming a set of cells for time difference measurements for a mobile terminal as claimed in claim 1, wherein a cell from the set of available cells is selected to the second set of cells whenever one of:

1) a base station identity code of the cell is not equal to a base station identity code of any other cell from the set of available cells; and 2) a base station identity code of the cell is equal to a base station identity code of any other cell from the set of available cells, and one of 2a) a measured time difference of the cell deviates from measured time differences for other cells sharing the same base station identity code more than a predefined threshold, and 2b) a signal strength of the cell is largest among all cells sharing the same base station identity code and the measured time difference of the cell deviates less than or equal to the predefined threshold.

* * * * *